3,206,428
NOVEL AMINE COMPLEXES OF HYDROXYBENZO-
PHENONES AS ULTRAVIOLET ABSORBERS
Lester N. Stanley, Delmar, N.Y., assignor to General
 Aniline & Film Corporation, New York, N.Y., a corporation of Delaware
No Drawing. Filed Dec. 27, 1960, Ser. No. 78,277
19 Claims. (Cl. 260—45.9)

This invention relates to novel amine complexes of orthohydroxybenzophenones and to a process for preparing them. More particularly, this invention relates to amine complexes of orthohydroxybenzophenones which are useful as ultraviolet absorbers and have excellent solubility, particularly in organic solvents.

It is known that a group of ortho-hydroxybenzophenones such as 2,4-dihydroxybenzophenones, 2-hydroxy-4-methoxybenzophenone, 2,2',4,4',-tetra-hydroxybenzophenone, and 2,2'-dihydroxy-4,4'-dimethoxybenzophenone, for example, are commercially useful and important as ultraviolet absorbers. However, the use of these compounds has been limited in their application as ultra-violet absorbers in cosmetics, plastics, paper, wood and the like due to their very low solubility in solvents, particularly organic solvents.

In accordance with this invention, it was unexpectedly found that adducts could be obtained by complexing ortho-hydroxybenzophenones with amines, which adducts possess, in addition to good ultraviolet absorption properties, excellent solubility in organic solvents.

An object of the present invention is to provide a new and useful class of products obtained by the amine complexing of ortho-hydroxybenzophenones.

Another object of the present invention is to provide a new class of compounds, that is, amine complexes of ortho-hydroxybenzophenones which have excellent solubility in organic solvents and good ultraviolent absorption properties.

These and other objects will become apparent from the following description.

The ortho-hydroxybenzophenones employed in accordance with the present invention are characterized by the following description and general formula:

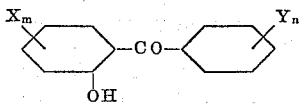

wherein X and Y represent hydrogen, hydroxy, lower alkyl, lower alkoxy and halogen, $m$ represents an integer of 1-2, and $n$ represents an integer of 1-3.

Representative examples of ortho-hydroxybenzophenones falling within the scope of the general formula include:
2,4-dihydroxybenzophenone
2-hydroxy-4-methoxybenzophenone
2-hydroxy-4-ethoxybenzophenone
2,2',4,4'-tetrahydroxybenzophenone
2,2'-dihydroxy-4,4'-dimethoxybenzophenone
Monochloro-2,2',4,4'-tetrahydroxybenzophenone
2,2'-dihydroxy-5-methylbenzophenone
2,2',4-trihydroxy-5-methylbenzophenone
2,2'-dihydroxybenzophenone
2,2',4'-trihydroxybenzophenone
2,2'-dihydroxy-3-methoxybenzophenone
2,3,4-trihydroxybenzophenone
2,4,4'-trihydroxybenzophenone
2,2'-dihydroxy-3-methylbenzophenone
2,2',3-trihydroxybenzophenone
2,2'-dihydroxy-6-methylbenzophenone
2,2'-dihydroxy-5-methoxybenzophenone
2,2'-dihydroxy-6-methoxybenzophenone
2,2'-dihydroxy-3,4-dimethoxybenzophenone
2,3,2'-trihydroxy-4-methoxybenzophenone
2,4-dihydroxy-2',3',4'-trimethoxybenzophenone
2,4-dihydroxy-2',3',4'-triethoxybenzophenone
2-hydroxy-4'-chlorobenzophenone
2,2'-dihydroxy-3-chlorobenzophenone
2,2'-dihydroxy-4-chlorobenzophenone
2,2'-dihydroxy-5-chlorobenzophenone
2,2'-dihydroxy-6-chlorobenzophenone
2-hydroxy-4',5-dichlorobenzophenone
2-hydroxy-5-chloro-4'-methylbenzophenone
2-hydroxy-2',4'-dimethoxy-5-chlorobenzophenone
2,2',4-trihydroxy-5-chlorobenzophenone
2,4-dihydroxy-2',4'-dichlorobenzophenone
2,4-dihydroxy-2'(and 4')-chloro-4'(and 2')-methylbenzophenone
2,4 - dihydroxy - 2'(and 4') - chloro-4'(and 2')-methoxybenzophenone
2,2'-dihydroxy-4'-bromobenzophenone
2,2',4-trihydroxy-5-bromobenzophenone Not only the ortho-hydroxybenzophenones listed above may be employed, but also mixtures thereof which is quite advantageous, since in their preparation, mixtures are frequently obtained rather than the pure product.

The amines found to be useful in accordance with this invention are any mono, dialkyl or cycloalkylamines. The higher amines, i.e., from about four carbon atoms and up, have been found to be most desirable. Thus, the preferred class of amines used in accordance with this invention are the dialkylamines of a chain length longer than about 8 carbon atoms. The amines may be used alone, or a plurality thereof may be employed when producing the products of the present invention.

Representative examples of amines useful for this invention include:

Dibutylamine
Diamylamine
Dioctylamine
Dodecylamine
Didodecylamine
Hexadecylamine
Dihexadecylamine
Octadecylamine
Dioctadecylamine
Octadecenylamine
Dioctadecenylamine
Octadecadienylamine
Dioctadecadienylamine
Ditetradecylamine
Mixed amines produced from oils such as soybean oil, coconut oil, tallow and the like The amine complexed benzophenones of the present invention may be prepared by heating to solution in an organic solvent, such as benzene or alcohol, equimolecular proportions of the reactants, thereafter crystallizing the solution by cooling or evaporation. The amine complexed benzophenones of this invention may also be prepared by melting equimolecular proportions of the reactants until a uniform mixture is formed, thereafter cooling said mixture to form the product of this invention. The thus formed amine-benzophenone adducts of this invention possess, as pointed out above, excellent solubility in organic solvents as well as good ultraviolet absorption properties. The exact nature of the products formed by this invention is not known, but they have been considered to be complexes. However, they may just as well be salts or solid solutions.

The amine complexed ortho-benzophenones of this invention not only have excellent hydrocarbon solvency power, but they are also compatible with polyethylene, polyester and polystyrene plastics and can therefore be easily incorporated into the plastic material to improve their stability to light and/or to protect the same from the destructive effect of ultraviolet radiation material to which they may be exposed.

The following examples are given by way of illustration and are not to be construed as limitations of this invention for many variations are possible within the scope and spirit of this invention.

*Example 1*

27.4 grams (0.1 mol) of 2,2'-dihydroxy-4,4'-dimethoxybenzophenone, 53 grams of Armeen 2S (0.1 mol) and 200 cc. benzene were heated at reflux until the mixture was almost in solution. The solvent (benzene) was evaporated on a steam bath and upon cooling the product formed was a wax-like mass (74 grams). The thus formed product is quite soluble in benzene and methyl ethyl ketone and has approximately the same ultraviolet curve as 2,2'-dihydroxy-4,4'-dimethoxybenzophenone had before it was complexed with Armeen 2S, i.e., affords protection against ultraviolet radiation in the range of 200 to 400 millimicrons (2000 to 4000 A.).

Armeen 2S is the trademark for a product of Armour. It is a secondary aliphatic amine consisting of a mixture of 20% dihexadecylamine, 20% dioctadecylamine, 25% dioctadecylamine and 35% dioctadecadienylamine.

*Example 2*

27.4 grams of 2,2'-dihydroxy-4,4'-dimethoxybenzophenone and 45 grams of Armeen 2C were melted together at a temperature of about 80° C. until a homogeneous melt was obtained. The melt was cooled to a waxy solid which had much greater solubility in benzene than the original benzophenone compound which was not complexed with an amine. The ultraviolet curve of this amine complexed 2,2'-dihydroxy-4,4'-dimethoxybenzophenone was similar to that of the uncomplexed parent compound, i.e., affords protection against ultraviolet radiation in the range of 200 to 400 millimicrons.

Armeen 2C is an Armour product consisting of a mixture of secondary amines, e.g., 8% dioctylamine, 9% didecylamine, 47% didodecylamine, 18% ditetradecylamine, 8% dihexadecylamine and 10% dioctadecylamine.

*Example 3*

100 grams of 2-hydroxy-4-methoxybenzophenone and grams of Armeen 2S (composition given in Example 1) were melted together as in Example 2. The resulting product had excellent solubility in both benzene and hexane whereas 2,4-dihydroxybenzophenone is less than 0.1% soluble in benzene and hexane.

*Example 4*

100 grams of 2-hydroxy-4-methoxybenzophenone and 230 grams of Armeen 2S (composition given in Example 1) were melted together as in Example 2. The resultant product has good solubility in both benzene and hexane. The ultraviolet curve of this amine complexed benzophenone is similar to the parent compound.

*Example 5*

100 grams of 2,2'-dihydroxy-4,4'-dimethoxybenzophenone and 190 grams of Armeen 2HT were melted together as in Example 2. The resultant product was quite soluble in benzene and the ultraviolet curve of this amine complexed benzophenone is similar to the parent compound.

Armeen 2HT is an Armour product comprising a mixture of secondary amines, e.g., approximately 25% dihexadecylamine and 75% dioctadecylamine.

*Example 6*

100 grams of 2,2',4,4'-tetrahydroxybenzophenone and 200 grams of Duomeen were melted together as in Example 2. The product formed was found to be soluble in benzene and hexane.

Duomeen is an Armour product comprising an N-alkyl propylenediamine wherein the alkyl group is derived from soya bean oil.

*Example 7*

28.8 grams of a product which is predominantly 2-hydroxy-2',4,4'-trimethoxybenzophenone and 24.1 grams of n-dioctylamine were melted together as in Example 2. The resultant product was found to be soluble in benzene.

*Example 8*

27.4 grams of 2,2' - dihydroxy - 4,4' - dimethoxybenzophenone and 27 grams of octadecylamine were melted together as in Example 2. The resultant product was quite soluble in benzene.

*Example 9*

27.4 grams of 2,2' - dihydroxy - 4,4' - dimethoxybenzophenone and 27.4 grams of Armeen TD were melted together as in Example 2. The resultant product was quite soluble in benzene.

Armeen TD is an Armour product which comprises approximately 30% hexadecylamine, 25% octadecylamine, and 45% octadecenylamine.

*Example 10*

27.4 grams of 2,2' - dihydroxy - 4,4' - dimethoxybenzophenone and 18.1 grams of dicyclohexylamine were melted together as in Example 2. The resultant product was found to be soluble in benzene.

*Example 11*

A small piece of polyethylene plastic weighing 5 grams and 0.1 gram of the product of Example 1 were heated together. As the two components melted, they were stirred to a homogeneous solution. The homogeneous solution was cooled and formed into a waxy uniform film. This film had ultraviolet absorbing properties similar to 2,2'-dihydroxy-4,4'-dimethoxybenzophenone.

What is claimed is:

1. An ultraviolet absorber soluble in organic solvents consisting essentially of an amine complexed benzophenone, said amine being selected from the group consisting of monoalkyl and dialkyl monoamines wherein the alkyl radical has from 4 to 18 carbon atoms, octadecenylamine, dioctadecenylamine, octadecadienylamine, dioctadecadienylamine, monocycloalkyl and dicycloalkyl amines, an N-alkyl propylene diamine derived from the reaction addust of soy bean oil and propylene diamine, and mixtures thereof and said benzophenone being a compound of the following general formula:

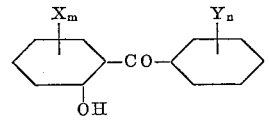

wherein X and Y represent a member selected from the group consisting of hydrogen, hydroxy, lower alkyl, lower alkoxy, and halogen, $m$ represents an integer selected from the group consisting of 1 and 2 and $n$ represents an integer selected from the group consisting of 1, 2 and 3.

2. The ultraviolet absorber of claim 1 wherein said benzophenone is 2,2' - dihydroxy-4,4'-dimethoxybenzophenone.

3. The ultraviolet absorber of claim 1 wherein said benzophenone is 2,4-dihydroxybenzophenone.

4. The ultraviolet absorber of claim 1 wherein said benzophenone is 2-hydroxy-4-methoxybenzophenone.

5. The ultraviolet absorber of claim 1 wherein said benzophenone is 2,2',4,4'-tetrahydroxybenzophenone.

6. The ultraviolet absorber of claim 1 wherein said benzophenone is 2 - hydroxy - 2',4,4'-trimethoxybenzophenone.

7. A composition stabilized against ultraviolet radiation comprising a plastic selected from the group consisting of polyethylene and polystyrene and a stabilizing amount of an amine complexed benzophenone ultraviolet absorber, wherein said amine is selected from the group consisting of monoalkyl and dialkyl monamines wherein the alkyl radical has from 4 to 18 carbon atoms, octadecenylamine, dioctyldecenylamine, octadecadienylamine, dioctadecadienylamine, monocycloalkyl and dicycloalkyl amines and mixtures thereof and said benzophenone is a compound of the following general formula:

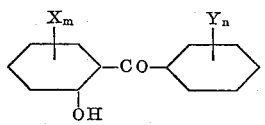

wherein X and Y represent a member selected from the group consisting of hydrogen, lower alkyl, lower alkoxy, and halogen, $m$ represents an integer selected from the group consisting of 1 and 2 and $n$ represents an integer selected from the group consisting of 1, 2 and 3.

8. The composition according to claim 5 wherein said benzophenone is 2,2' - dihydroxy - 4,4' - dimethoxybenzophenone.

9. The composition according to claim 5 wherein said benzophenone is 2,4-dihydroxybenzophenone.

10. The composition according to claim 5 wherein said benzophenone is 2-hydroxy-4-methoxybenzophenone.

11. The composition according to claim 5 wherein said benzophenone is 2,2',4,4'-tetrahydroxybenzophenone.

12. The composition according to claim 5 wherein said benzophenone is 2-hydroxy - 2',4,4' - trimethoxybenzophenone.

13. The ultraviolet absorber according to claim 1 wherein said amine is a dialkyl monamine having from 4 to 18 carbon atoms in said alkyl groups.

14. The ultraviolet absorber according to claim 1 wherein said amine is a monoalkyl monoamine having from 4 to 18 carbon atoms in said alkyl group.

15. The ultraviolet absorber according to claim 1 wherein said amine is a dicycloalkyl monoamine.

16. The composition according to claim 7 wherein said plastic is polyethylene.

17. The composition according to claim 7 wherein said amine is a dialkyl monoamine having from 4 to 18 carbon atoms in said alkyl groups.

18. The composition according to claim 7 wherein said amine is monoalkyl monoamine having from 4 to 18 carbon atoms in said alkyl group.

19. The composition according to claim 7 wherein said amine is a dicycloalkyl monoamine.

References Cited by the Examiner
UNITED STATES PATENTS

| | | | |
|---|---|---|---|
| 2,000,040 | 5/35 | Semon et al. | 260—566 |
| 2,015,696 | 10/35 | Semon | 260—566 |
| 2,301,861 | 11/42 | Downing et al. | 260—45.9 |
| 2,947,721 | 8/60 | Newland et al. | 260—45.9 |
| 2,984,645 | 5/61 | Hoeschele | 260—45.9 |
| 2,985,617 | 5/61 | Salyer et al. | 260—45.9 |

OTHER REFERENCES

Pieper: Methoden Der Organischen Chemie, published by Eugen Muller, II/III, 1958, p. 92.

LEON J. BERCOVITZ, *Primary Examiner.*

ALPHONSO D. SULLIVAN, JOSEPH R. LIEBERMAN, *Examiners.*